Patented Oct. 20, 1953

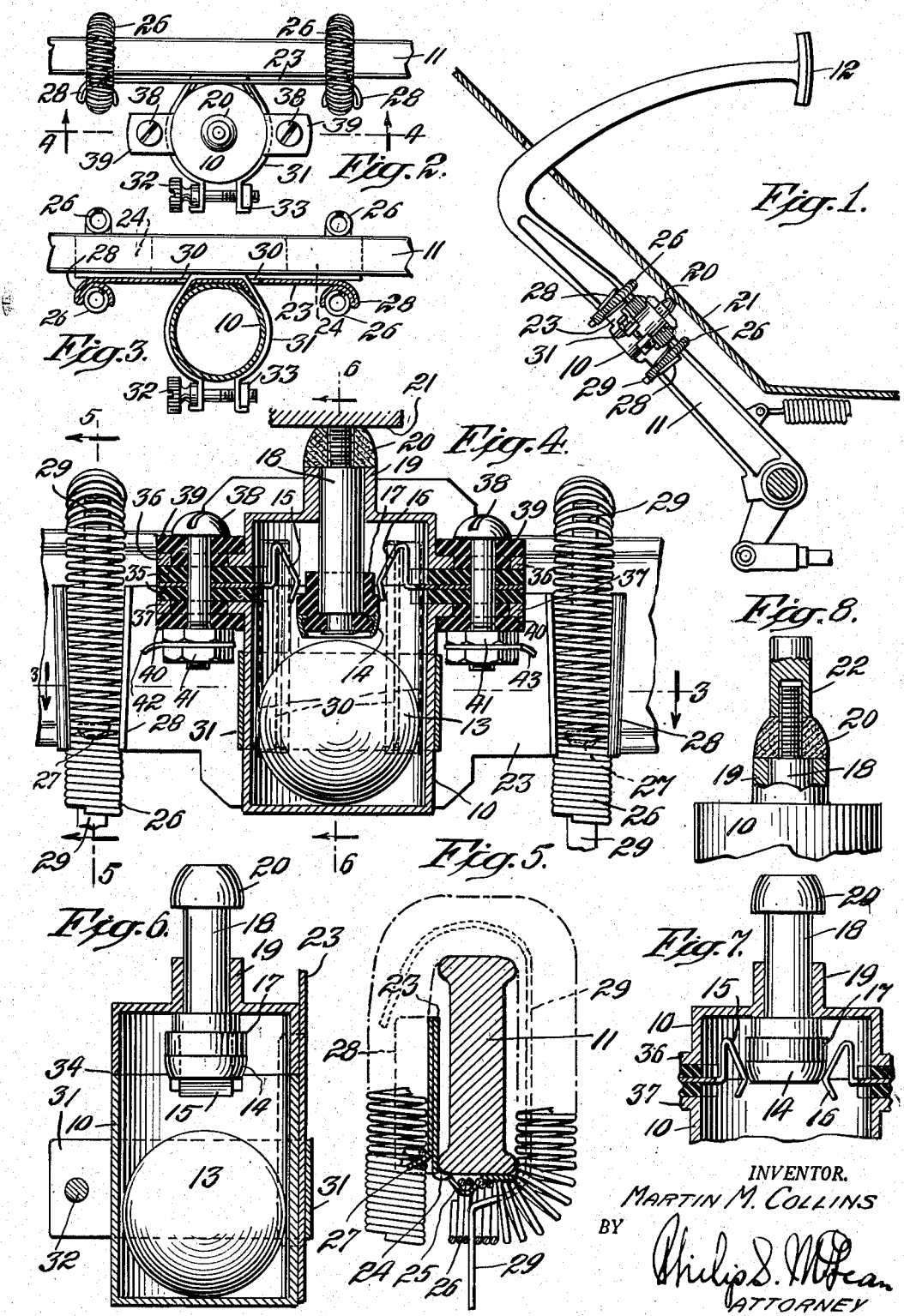

2,656,139

UNITED STATES PATENT OFFICE 2,656,139

INERTIA SWITCH

Martin M. Collins, Jackson Heights, N. Y.

Application October 29, 1949, Serial No. 124,379

3 Claims. (Cl. 248—226)

The invention herein disclosed is a switch for use on motor vehicles for automatically sounding a horn or warning device or for operating a "sander" or the like, when the brake pedal is operated quickly, as in the case of an emergency.

Briefly stated, the invention is in the nature of an inertia switch mounted on the shank of the brake pedal and remaining inoperative during ordinary brake usage but arranged, in the case of sudden or emergency application of the brake, to close the circuit through a signal device or to operate safety or other equipment requisite to the circumstances.

Special objects of the invention are to provide a device of this nature which may be quickly and easily applied to various makes and sizes of cars and adjusted to suit the operation of such cars, which will be small in size and light in weight, so as not to interfere with normal or usual operation of the brakes, which will consist of but few, simple, inexpensive parts, rugged in design and not liable to get out of order, and which will be generally practical, reliable and desirable for the purposes indicated.

Other desirable objects attained by the invention are set forth or will appear in the course of the following specification.

The drawing accompanying and forming part of the specification illustrates a practical commercial embodiment of the invention. Actual structure, however, may be modified and changed in certain respects, all within the true intent and broad scope of the invention as hereinafter defined and claimed.

Fig. 1 in the drawing is a broken part sectional view showing the inertia switch as mounted and ready for use on the shank portion of an automobile brake pedal;

Fig. 2 is a plan view of the switch structure as mounted on the brake pedal shank, the latter broken away;

Fig. 3 is a partial plan and generally horizontal sectional view as on substantally the plane of line 3—3 of Fig. 4;

Fig. 4 is an enlarged broken sectional view on substantially the plane of line 4—4 of Fig. 2;

Fig. 5 is a broken sectional view showing particularly one of the spring clamps as on substantially the plane of line 5—5 of Fig. 4;

Fig. 6 is a vertical sectional view on substantially the plane of line 6—6 of Fig. 4;

Fig. 7 is a broken sectional detail on substantially the plane of Fig. 4 but showing the contact lifted and left in the upper circuit closing position;

Fig. 8 is a broken sectional detail showing how different length switch return tips may be applied to the end of the contactor spindle.

As shown in the several views, the switch comprises, in general, a small cylindrical casing 10 designated to be clamped on the shank or lever portion 11 of a motor vehicle brake pedal 12 and containing a loose ball or inertia device 13 arranged on sudden downward movement of the pedal to drive a switch contact 14 upward into bridging engagement with stationary spring contacts 15, 16, entered in the opposite sides of the casing.

The movable switch contact 14 is shown in the form of a ring on the lower end of a button or knob 17 of insulating material riveted or otherwise secured on the lower end of a spindle 18 operating up through a guide 19 in the top of the casing.

The upper end of the spindle is shown as screw threaded and as having an elastic stop nut 20 screwed thereon and engaging the upper end of the guide 19 to limit the lowering or retractive movement of the spindle, preferably in a position to leave the contact carrying head on the lower end of the spindle just above and clear of the loose ball, as in Fig. 4.

The stationary contacts 15, 16, are shown as extending inwardly into the housing over the top of the contact carrying head to yieldingly normally retain the plunger in the lowered position. These contacts, however, are readily yieldable to the upward thrust of the contact head and arranged to hold the head and the plunger in the uplifted position shown in Figs. 6 and 7, when actuated to that effect by the loose ball.

Consequently, when operated by a quick movement of the brake pedal, the switch will remain in the circuit closed position shown in Figs. 6 and 7, until the plunger is again depressed as by engagement of the upper end of the same with the floor board 21, as shown in Figs. 1 and 4.

To facilitate and provide for restoration of the switch to open circuit position, various lengths of tips may be applied to the upper, screw threaded end of the plunger, either longer or shorter as required to meet existing conditions, as indicated by the special added longer tip 22 shown in Fig. 8.

Further, to enable proper correlation and operation of parts, the switch is adjustably but firmly mounted on the brake pedal and the contact carrying portions of the switch are adjustable on the base or carrying portion of the switch.

In the illustration, the supporting portion consists of a flat base plate 23, adapted to fit flat against the side of the brake pedal shank and having angularly extended lugs 24 at the lower edge to snugly engage under the bottom of the shank, as shown in Fig. 5.

These positioning lugs 24 are shown as having loops 25 to receive several turns or coils of the clamping springs 26 which extend from these points of anchorage about the shank and are caught at the front by the downwardly angled hook forming lugs 27.

These hook lugs 27 may have rounded edges, as shown in Fig. 4, to facilitate penetration between the coils of the springs when the springs are being pulled about and tensioned over the shank.

When the springs are thus caught over the lugs they will remain secure in this relation because of the downward inclination of the lugs and the tensioning of the springs in this relation.

To further assure permanent, reliable connection of the tensioned holding springs, the base plate 23 is shown as carrying substantially semicircular guides 28 partly enclosing the tensioned portions of the springs. These guides are shown in Fig. 4 as tapered downwardly and as reduced at their lower ends to closely fit and confine the springs in their hooked engagement with the base plate.

These holding springs provide a quick and easily applied form of connection for securely and firmly holding the switch in position on the shank and one which will permit the switch to be bodily shifted along the shank to the best position for switch operation.

To assist in hooking the springs about the shank, a finger grip 29 is shown in Figs. 4 and 5, in the form of a small strip entered through the coils at the permanently anchored end of each spring and extended up through the spring far enough to give it a firm location therein. The lower, grip portion of this inserted strip will then project below the spring for engagement by one finger while the thumb and another finger are employed to tension the spring and push it into guide 28 and onto hook 27.

Adjustment of the contact carrying parts is provided for in the illustration by slotting the base plate at 30 and looping a flexible band 31 through said slots and about the cylindrical casing 10, with the ends of this band caught together at the front by a clamping screw and nut 32, 33.

On loosening the screw 32 the clamp and housing may both be adjusted on the base, with the clamp sliding in the slots 30, or the clamp may be left in position in the slots and the casing be adjusted with respect to the clamp and base, the casing may be rotatably adjusted in the clamp, or any combination of these adjustments may be effected.

If there is insufficient room on one side, the switch may be applied to the other side of the pedal shank.

The flexibiilty and variety of adjustments described make it possible to mount and properly set the switch on practically all makes of motor vehicles.

To simplify and make the switch parts accessible, the cylindrical casing is shown as made in upper and lower sections, abutting on a transverse separation line 34, Fig. 6, and the contact springs 15, 16, are shown as held between insulating pads 35 caught between outstanding lugs 36, 37, on the upper and lower sections, and the whole assembly held together by screws 38 passing through insulating washers 39, 40, and casing lugs 36 and 37. The nuts 41 at the lower ends of these screws may be used to secure the wires 42, 43, for the switch as well as for mechanically fastening the parts together.

The wires indicated at 42, 43, may be connected with a horn or signal device and/or with safety or other equipment.

The mounting of the switch mechanism on the face of the base plate between the spring guides at opposite ends of the same provides a particularly compact arrangement of small size and light weight which can be mounted in the limited space beneath the floor board and which will not interfere in any way with proper operation of the brake pedal.

The handle forming strips 29, as indicated in Fig. 5, may extend entirely or nearly all the way through the springs and be bent more or less in conformity with the loop formation of the springs so as to hold the springs somewhat to the looped formation when removed from the brake pedal and to prevent the springs from snapping out into fully straightened position if the fingers should slip in applying the device to the brake pedal. These finger grips are generally of assistance in holding the switch in place and in drawing the springs to fully tensioned position about the brake pedal shank. These clamping and supporting springs, when properly tensioned, firmly and positively secure the switch in its adjusted position on the pedal shank but they can be readily released, when desired, to permit removal of the switch for inspection or other purposes.

The separable, two-part structure of the switch casing is desirable for inspection purposes, enabling the switch to be quickly opened up and internal parts exposed.

The clamp screw 32 is located at the front where it can be readily tightened by the fingers of one hand while holding the switch upward in the clamp with the fingers of the other hand to engage the top of the plunger with the foot board. After such preliminary adjustment the entire assembly may be removed and the clamp screw fully tightened to secure the switch elements in properly adjusted relation on the base.

If desired, the ball may be of lead or other heavy metal to render the switch particularly sensitive. The construction is such that the switch may be operated consciously or unconsciously, that is, with a quick movement, either purposely as to effect operation of a sander or the like, or without premeditation, as in the case of an emergency.

The angularly projecting lugs 24 of the base plate, by engagement beneath the lower edge of the brake pedal shank, assure that the switch will positively follow and be actuated by any quick movement of the brake pedal and that therefore there will be no lag in the operation of the switch.

What is claimed is:

1. A mounting for a switch of the character disclosed comprising a base to lay against the shank of a brake pedal and having an angularly projecting lug to engage the under side of the shank to thereby position the base on said shank, helically coiled springs encircling opposite end portions of the base plate, said springs being connected each at one end with said base plate, said springs being of a length to be looped about the back and over the top of the shank and down over the face of the base plate, and means for adjustably securing the free ends of said springs to said base plate as thus turned down over the face of the base plate and including guides holding said springs in position encircling said opposite end portions of the base plate.

2. A switch support of the character disclosed comprising a base plate having spaced guides extending transversely across opposite end portions of the same, coil springs secured to said base plate and adapted to fit in said guides, said springs being of a length to be looped about the shank of a brake pedal, means for adjustably securing the ends of said coil springs in position looped about a brake pedal shank and engaged in said guides and means for mounting said springs, said means including hook elements projecting from the base plate within said guides and arranged to enter between adjoining convolutions of the coil springs.

3. A device of the character disclosed comprising a switch mounting base plate for engagement against the side of a brake pedal shank and having a positioning lug for engagement beneath the lower edge of the shank, a coil spring connected at one end with said positioning lug and extendable therefrom about the brake shank and over the face of the base plate, a hook-like projection on said base plate for holding engagement with the free end of said spring.

MARTIN M. COLLINS.

References Cited in the file of this patent

UNITED STATES PATENTS

| Number | Name | Date |
|---|---|---|
| 499,549 | Hunter et al. | June 13, 1893 |
| 1,510,912 | Allen | Oct. 7, 1924 |
| 1,719,742 | Adams | July 2, 1929 |
| 2,064,290 | Campbell et al. | Dec. 15, 1936 |
| 2,156,751 | Collins | May 2, 1939 |
| 2,236,872 | Grigsby | Apr. 1, 1941 |
| 2,292,619 | De Smidt | Aug. 11, 1942 |
| 2,347,894 | Drury | May 2, 1944 |
| 2,445,873 | Chambers | July 27, 1948 |
| 2,558,768 | McCormick | July 3, 1951 |